(12) United States Patent
Buttimer

(10) Patent No.: US 10,095,092 B2
(45) Date of Patent: Oct. 9, 2018

(54) ARTICULATED STABILIZER FRAME FOR MONOPOD

(71) Applicant: Gerald F Buttimer, Hinsdale, IL (US)

(72) Inventor: Gerald F Buttimer, Hinsdale, IL (US)

( * ) Notice: Subject to any disclaimer, the term of this patent is extended or adjusted under 35 U.S.C. 154(b) by 0 days.

(21) Appl. No.: 14/867,760

(22) Filed: Sep. 28, 2015

(65) Prior Publication Data

US 2017/0075199 A1     Mar. 16, 2017

Related U.S. Application Data

(60) Provisional application No. 62/218,343, filed on Sep. 14, 2015.

(51) Int. Cl.
   *G03B 17/56*     (2006.01)
   *F16M 11/20*     (2006.01)
   *F16M 13/02*     (2006.01)

(52) U.S. Cl.
   CPC ........... *G03B 17/563* (2013.01); *F16M 11/20* (2013.01); *F16M 13/02* (2013.01); *G03B 17/561* (2013.01)

(58) Field of Classification Search
   CPC ........ G03B 17/561; G03B 17/563; A45B 5/00
   See application file for complete search history.

(56) References Cited

U.S. PATENT DOCUMENTS

| | | | |
|---|---|---|---|
| 1,957,033 A * | 5/1934 | Silverman | ................ A45B 5/00 135/82 |
| 4,963,904 A | 10/1990 | Lee | |
| 5,538,212 A | 7/1996 | Kennedy | |
| 5,664,750 A | 9/1997 | Cohen | |
| 5,705,578 A | 1/1998 | Peifer et al. | |
| 5,742,859 A | 4/1998 | Acker | |
| 5,749,010 A | 5/1998 | McCumber | |
| 5,839,704 A | 11/1998 | Appleman | |
| 6,021,984 A | 2/2000 | Mills | |
| 6,962,313 B1 | 11/2005 | Marks, Jr. | |
| 7,232,265 B1 | 6/2007 | Price | |
| 7,244,070 B2 | 7/2007 | Burnett et al. | |
| 8,152,389 B1 | 4/2012 | Lammens | |
| 2002/0001470 A1 | 1/2002 | Linnecke | |
| 2007/0031143 A1 | 2/2007 | Riccardi | |
| 2009/0174232 A1* | 7/2009 | Hoffman | ................... A47C 4/42 297/16.1 |
| 2010/0153061 A1* | 6/2010 | Hietmann | ............... G01S 5/163 702/152 |
| 2011/0173778 A1* | 7/2011 | Wales | ...................... B25G 3/20 16/426 |
| 2011/0192951 A1* | 8/2011 | Gooch | ................... F16M 11/12 248/316.7 |
| 2013/0004153 A1* | 1/2013 | McKee | ................ F16M 11/041 396/420 |
| 2013/0047802 A1* | 2/2013 | Vierck | ................. A01D 34/416 81/489 |

(Continued)

*Primary Examiner* — Clayton E Laballe
*Assistant Examiner* — Noam Reisner
(74) *Attorney, Agent, or Firm* — John C. McMahon

(57) ABSTRACT

A camera support apparatus includes a telescopically collapsible monopod, a clamp structure with a support clamp at one end which is adapted for securing the clamp structure to the monopod and a frame clamp at an opposite end, and a stabilizer frame loop which is frictionally engaged with the frame clamp in such a manner as to enable the loop to be set in a selected angular relation to the monopod and readjusted as needed.

26 Claims, 5 Drawing Sheets

(56) References Cited

U.S. PATENT DOCUMENTS

2013/0233988 A1* 9/2013 Johnson ............... G03B 17/561
 248/229.14
2015/0316837 A1* 11/2015 Maltese ................ F16M 13/04
 294/139

* cited by examiner

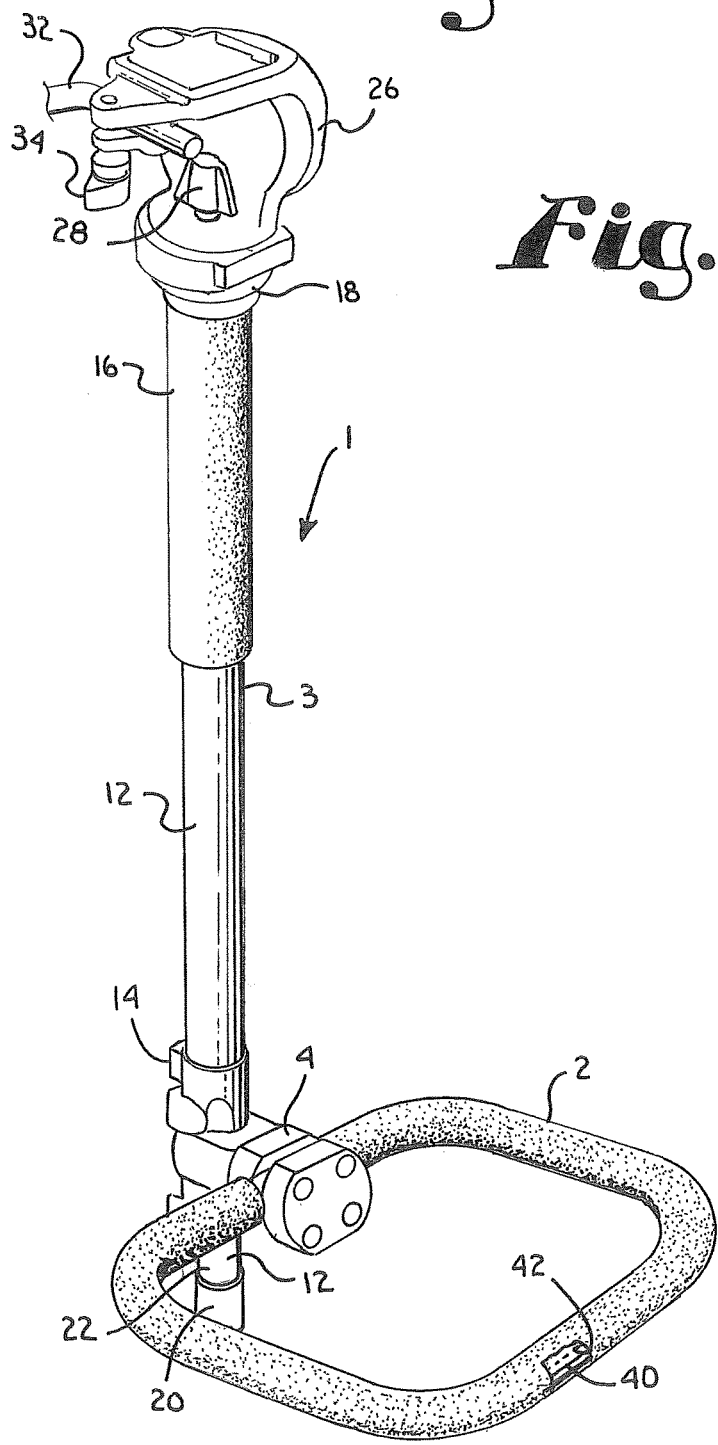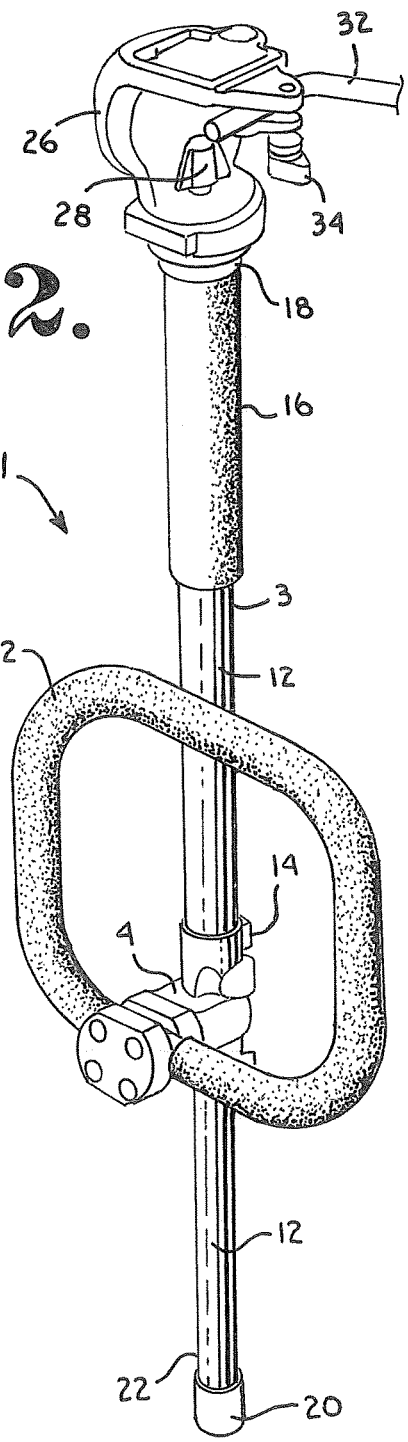

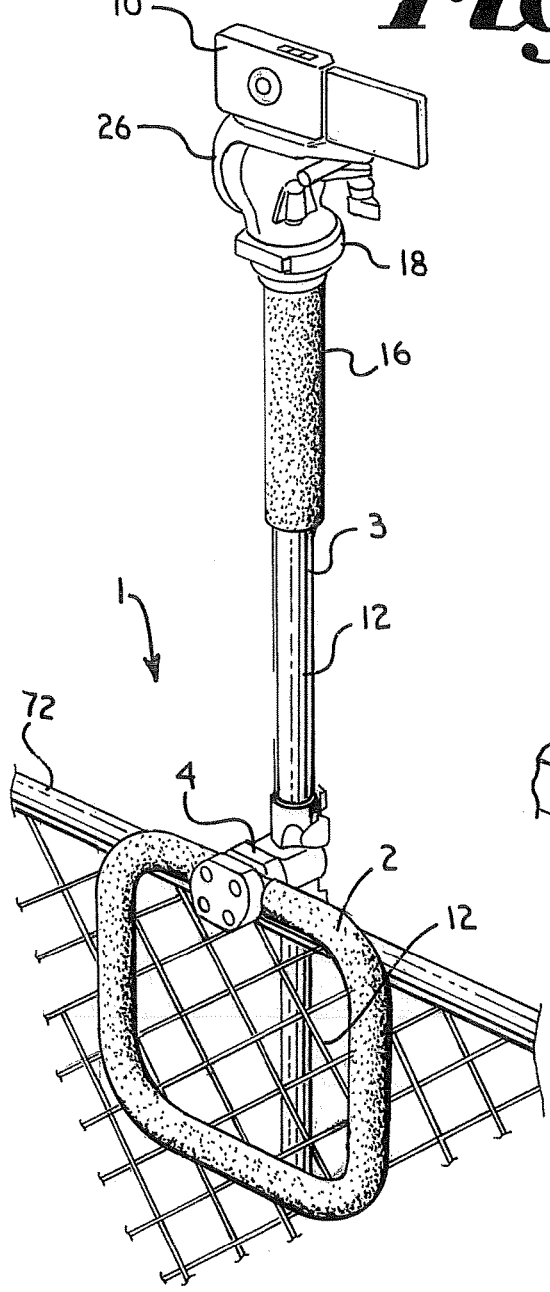
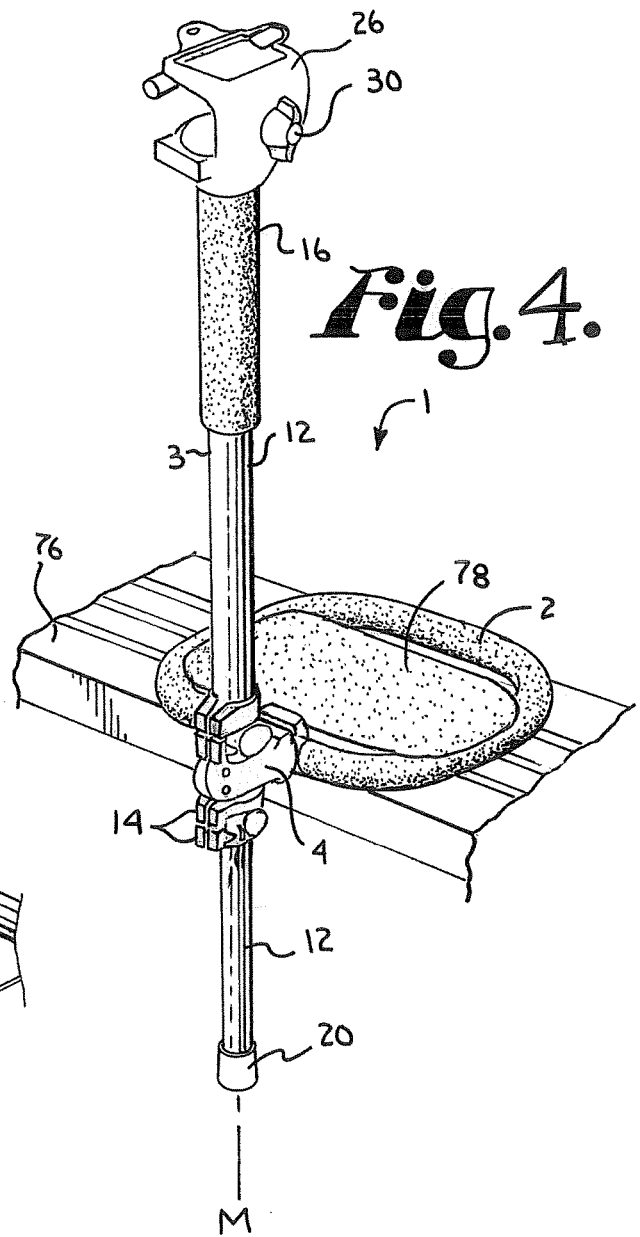

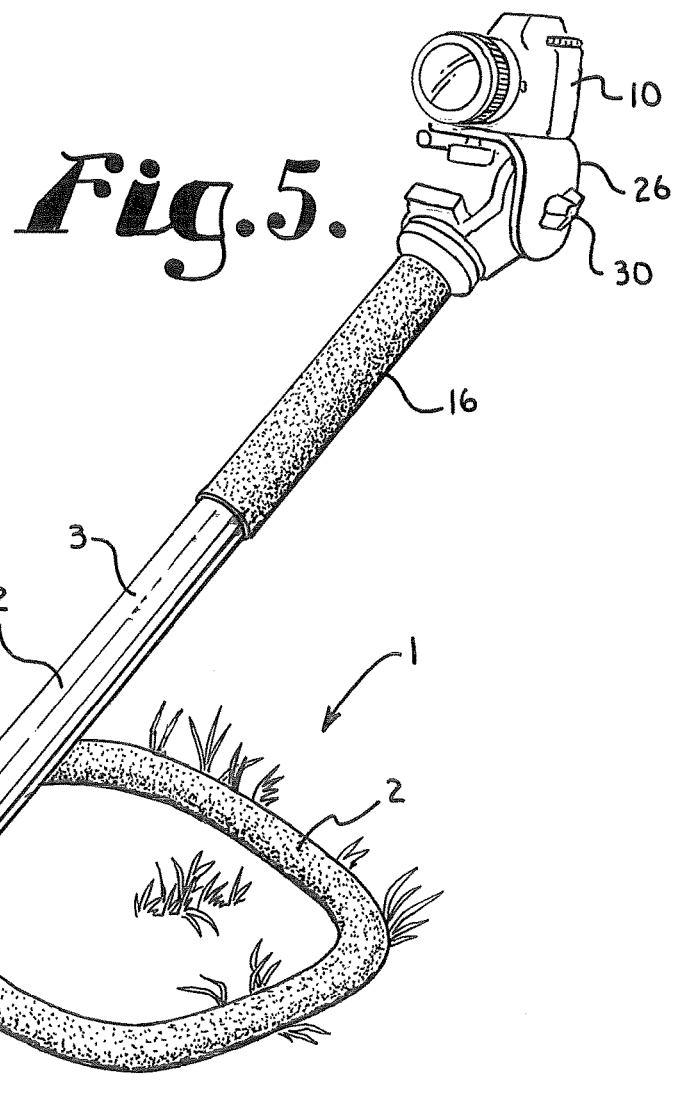
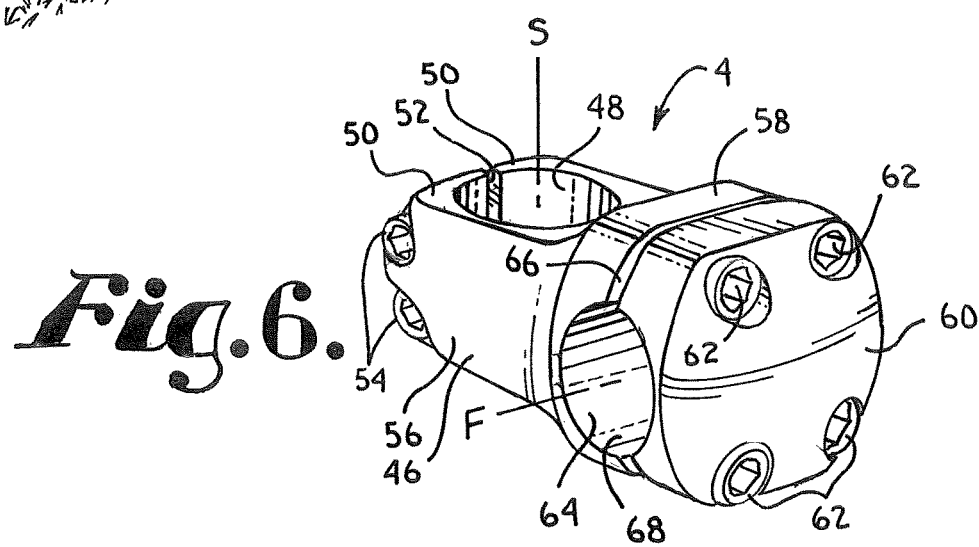

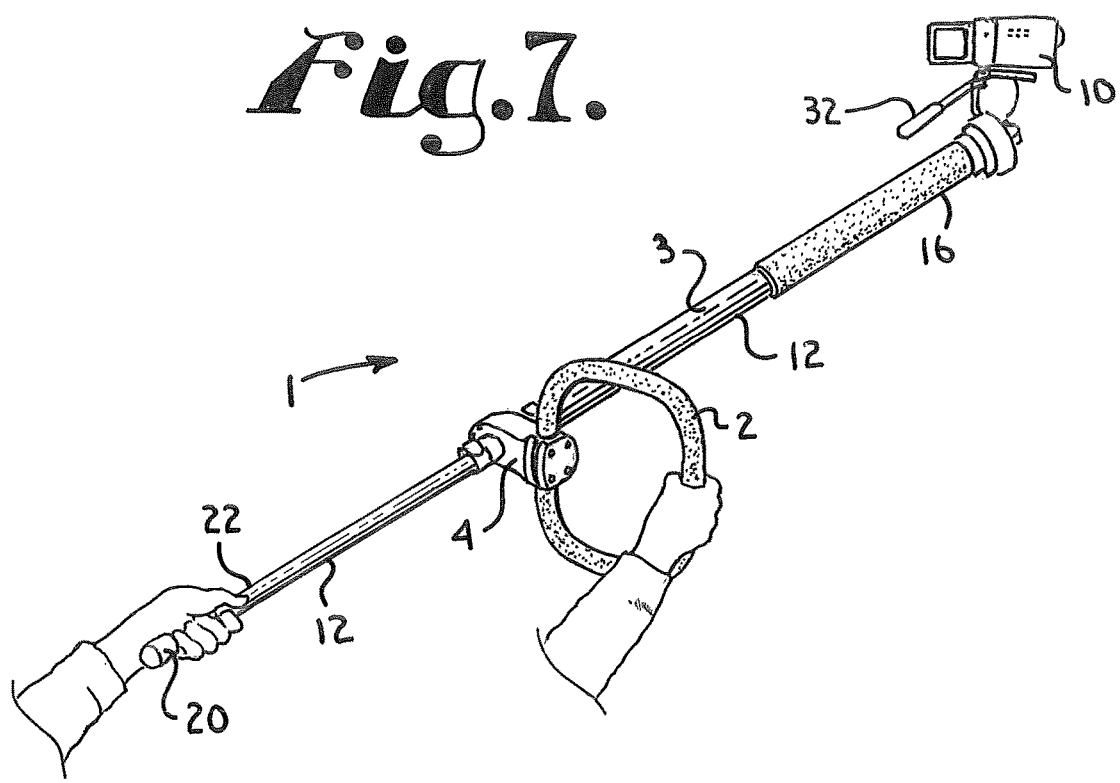
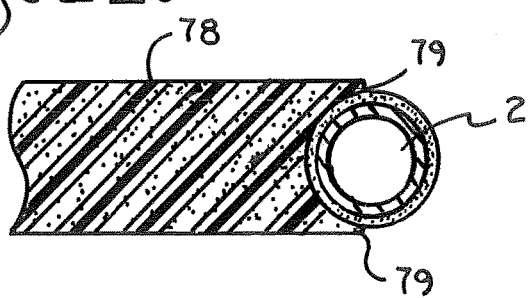

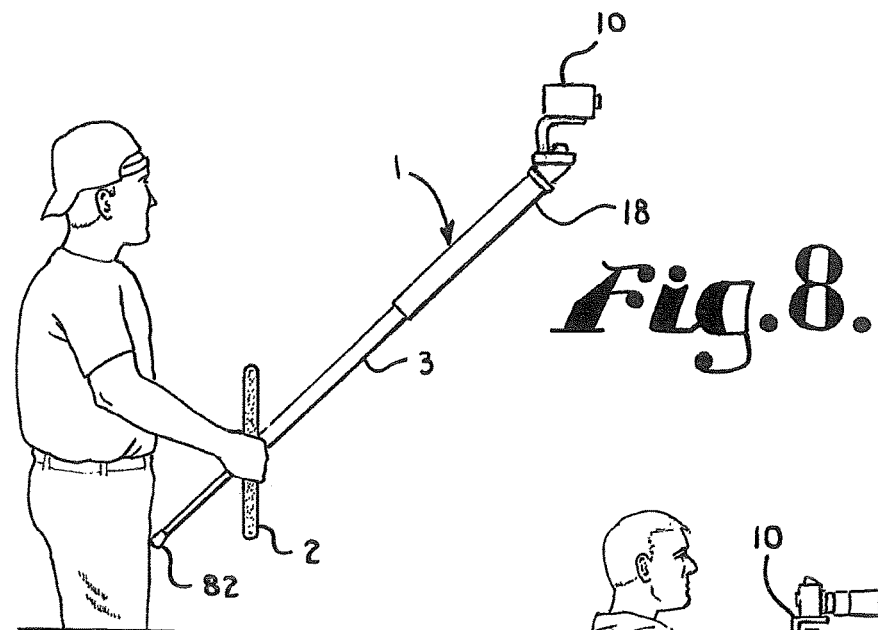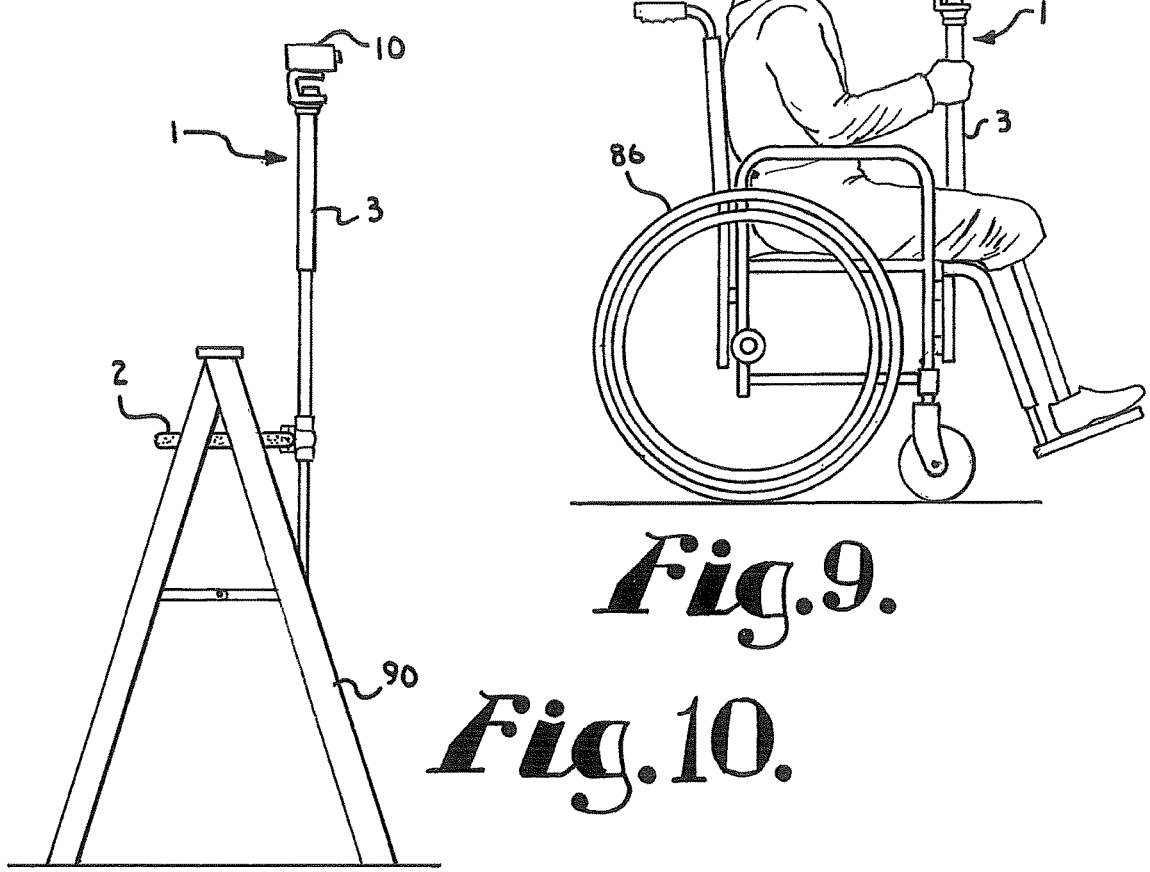

ARTICULATED STABILIZER FRAME FOR MONOPOD

CROSS-REFERENCE TO RELATED APPLICATIONS

This application claims the benefit of U.S. Provisional Patent Application Ser. No. 62/218,343 filed Sep. 14, 2015 which is incorporated by reference herein.

BACKGROUND OF THE INVENTION

The present invention is broadly concerned with improvements in photographic equipment and, more particularly, to improvements in monopod support devices for cameras.

While satisfactory images are often recorded using handheld cameras, the quality of still and moving images is often improved by steady support of the camera recording the images. Handheld image capture devices such as smart phones, cameras, camcorders, and the like are prone to shake, shudder, and vibration. This negative effect is magnified when zooming in on a subject, as is often done in photography for sports, action news events, art, nature, and the like.

Historically, cameras have been supported by structures having multiple legs, such as tripods. The widely spaced points of ground contact of a tripod provide a stable platform for a camera against vertical and lateral forces. However, tripods tend to be relatively heavy, take up a considerable ground or floor area, and can be trip hazards to persons not aware of their presence. The use of tripods can be awkward in tiered type seating structures such as bleachers, stadiums, and the like. For these reasons, tripods are sometimes restricted at many public events and venues, such as sporting events and the like.

In order to overcome some of the problems associated with tripods, other types of camera support structures have been developed, such as monopods, also known as unipods. As the name implies, a monopod is a single legged structure. Typical monopods are telescopically collapsible and have means to releasably attach a camera thereto, such as a pan and tilt head which enables pivoting the attached camera about vertical and horizontal axes. Monopods tend to be lighter in weight and more compact than tripods and take up less space when deployed. While a monopod supports the weight of a camera and, thus, steadies it vertically, undesired movement and shaking of the camera in lateral directions is still possible.

SUMMARY OF THE INVENTION

The present invention provides embodiments of an improved camera support apparatus incorporating an elongated camera support, such as a monopod, and an articulated stabilizer frame which provides improved stability for a camera supported on the apparatus. An embodiment of the support apparatus includes a monopod camera support member, a clamp structure including a camera support clamp adapted to secure the clamp structure to the monopod, a stabilizer frame member, and the clamp structure including a frame clamp adapted to secure the frame member to the clamp structure.

In an embodiment of the support apparatus, the frame clamp frictionally engages the frame member in such a manner as to enable selective angular articulation of the frame member relative to the monopod. Preferably, the frictional engagement is of such a character as to retain the frame member at a set angle relative to the monopod and to enable the friction to be overcome to enable manual repositioning of the frame member through a range of angles between the frame member and the monopod.

In an embodiment of the support apparatus, the stabilizer frame member is of a rectangular loop shape, such as a square loop shape. The stabilizer loop may be covered in a vibration damping material and may have a seat pad extending thereacross to enable the apparatus to be stabilized by a photographer sitting on the stabilizer loop. The support clamp has a support clamp axis, and the frame clamp has a frame clamp axis. In an embodiment of the support apparatus, the frame clamp axis is positioned in spaced relation to the support clamp axis to facilitate stabilization of the support apparatus by folding the stabilizer loop down to enable the support apparatus to be supported on a horizontal structure, such as a fence or the like.

In an embodiment of the support apparatus, the monopod is telescopically collapsible such that the overall length thereof can be varied from a completely collapsed state to a fully extended state. The monopod may include a pan and tilt head to facilitate aiming of the camera to follow a moving subject.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a perspective view of a monopod camera support apparatus including an embodiment of an articulated stabilizer frame of the present invention shown in a horizontal orientation.

FIG. 2 is a perspective view of the monopod camera support apparatus with the stabilizer frame shown in an upwardly folded orientation.

FIG. 3 is a perspective view of the apparatus at reduced scale with the stabilizer frame shown in a downwardly folded orientation to engage a horizontal support structure.

FIG. 4 is a perspective view of the apparatus with the stabilizer frame shown in a horizontal orientation on a seating bench and having a seat pad engaged therewith to enable steadying of the apparatus by a seated photographer (not shown).

FIG. 5 is a perspective view of the apparatus with the monopod telescopically collapsed and the stabilizer frame folded to an angular orientation to form a ground support for a camera.

FIG. 6 is a greatly enlarged perspective view of an embodiment of clamp assembly to secure the stabilizer frame to the monopod.

FIG. 7 is a perspective view at a reduced scale and shows the apparatus with the monopod fully extended and the stabilizer frame folded out from the monopod to enable use of the apparatus as a camera support boom.

FIG. 8. is a diagrammatic side elevational view of the apparatus, shown in use with a belt worn flagpole support cup to support a lower end of the monopod while the stabilizer frame is manually grasped.

FIG. 9 is a view similar to FIG. 8 and shows the apparatus in use by a photographer seated on the stabilizer frame in a wheelchair.

FIG. 10 is a view similar to FIG. 8 and shows the apparatus with the stabilizer frame engaged with a ladder to steady a camera mounted on the apparatus.

FIG. 11 is a greatly enlarged fragmentary cross sectional view of a portion of a seat cushion for the stabilizer frame.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a camera support apparatus incorporating an articulated stabilizer frame 2 according to the present invention. The apparatus 1 generally includes an elongated camera support member or monopod 3 and a clamp structure 4 which joins the stabilizer frame or loop 2 to the monopod 3 in such a manner as to enable articulation of the loop 2 with respect to the clamp structure 4 and the monopod 3.

The monopod 3 may be a conventional monopod camera support member adapted for supporting a camera 10 (FIGS. 3, 5, and 7. The illustrated monopod 3 includes multiple telescoping sections 12 which can be selectively extended or retracted by the use of section clamp mechanisms 14. The section clamp mechanisms 14 may be conventional types of clamp mechanisms which be operated to compress or release a split end (not shown) of a monopod section 12 where it engages an adjacent section 12. The illustrated monopod 3 is shown with a padded sleeve 16 near an upper end 18 thereof and a padded tip or cap 20 at a lower end 22 thereof.

The monopod 3 includes structure or a mechanism for releasably attaching the camera 10 thereto. The illustrated monopod 3 includes a pan and tilt head 26 secured to the upper end 18 thereof. The illustrated pan and tilt head 26 is a type of gimbal apparatus which enables pivoting or panning the camera 10 about a longitudinal axis M (FIG. 4) of the monopod and tilting the camera 10 about a tilt axis T. The illustrated head 26 includes a pan lock screw 28 (FIG. 1) to lock the head 26 at a selected pan angle and a tilt lock screw 30 (FIG. 4) to lock the head at a desired tilt angle. The screws 28 and 30 can also be used to adjust the tightness or looseness of the head respectively in the pan and tilt functions of the head 26. The head 26 may also include a viscous damping arrangement (not shown) to smooth panning and tilting actions of the components of the head. The pan lock screw 28 may also function to enable the head 26 to be removed from the monopod 3. The illustrated pan and tilt head 26 includes a control arm 32 (FIGS. 2 and 7) to facilitate operation of the head. Orientation of the control arm 32 may be adjusted using a control arm screw 34.

The illustrated stabilizer frame 2 is a square loop which is pivotally connected to the clamp structure 4. It is foreseen that the frame 2 could alternatively have a non-square rectangular shape, a circular shape, an oval shape, or the like. The illustrated loop 2 is formed of a tubular structural member 40 having a circular cross section which is formed into the desired shape. The structural member 40 may be formed of a metallic material, such as an aluminum alloy, and is padded by a vibration damping sleeve or coating 42, such a foam polymer. The padded sleeve 42 stops short of the clamp structure 4 to avoid interference therewith. Ends (not shown) of the structural member 40 may meet in opposed relation within the clamp structure 4.

Referring particularly to FIG. 6, the illustrated clamp structure 4 includes a clamp body 46 which may be formed of a material such as an aluminum alloy. The clamp body 45 has a substantially cylindrical camera support bore 48 formed therethrough along a camera support bore axis S. Camera support clamp jaws 50 are formed at an end of the clamp body and are separated in opposed relation by an end gap 52. Fasteners 54, such as screws, are threaded into the jaws 50 which are sufficiently resilient that tightening of the screws 54 draws the jaws 50 toward one another to clamp the clamp structure 4 onto the monopod 3. The camera support bore 48, clamp jaws 50, and screws 54 cooperate to form a camera support clamp 56.

An enlargement at an opposite end of the illustrated clamp structure 4 forms an inner frame bearing plate 58. An outer frame bearing plate 60 is secured to the inner bearing plate 58 by pairs of threaded fasteners or screws 62. A substantially cylindrical frame clamp bore 64 is formed through the inner and outer bearing plates 58 and 60 along a frame clamp bore axis F, which is substantially perpendicular to the camera support bore axis S. The inner and outer bearing plates 58 and 60 are separated by a frame clamp gap 66. Tightening of the screws 62 reduces the frame clamp gap 66 to secure the clamp structure 4 about the structural member 40 of the frame clamp loop 2. The inner and outer bearing plates 58 and 60 and the screws 62 form a frame clamp 68.

Typically, the camera support clamp 56 is tightened about the monopod 3 such that the clamp structure 4 does not move relative to the monopod. In an embodiment of the apparatus 1, the frame clamp 68 is tightened to enable continuous angular articulation of the loop 2 relative to the monopod 3 through a range of angles. Friction between the frame clamp 68 and the loop 2 is of such a character as to retain the loop 2 at a set angle relative to the monopod 3 and to enable the friction to be overcome so that the loop 2 can be selectively repositioned relative to the monopod 3. This is somewhat similar to the frictional relationship between the display and body of a laptop computer, with a higher level of friction between the frame clamp 68 and the loop 2 because of the weights of the components involved.

It is also foreseen that the camera support clamp 56 could be manually released to enable alternative positioning of the loop 2 along the monopod 3. Additionally, it is foreseen that the frame clamp 68 could employ manually adjustable screws 62 so that the frame clamp 68 could be tightened to secure the loop 2 in a desired angular orientation relative to the monopod 3. Such variations are intended to be encompassed within the scope of the present invention.

In use, the stabilizer loop 2 can be folded toward the upper end 18 of the monopod 3 (FIG. 1) and the monopod 3 telescopically collapsed for compact transportation of the apparatus 1. It is foreseen that the number of monopod section 12 and their length can be adjusted so that the size of the apparatus 1, as reduced, is suitable for packing in a suitcase sized carrier, similar to the types of cases provided by Pelican Products, Inc. (www.pelican.com) and other sources. The spacing of the camera support bore axis S of the clamp structure 4 from the frame clamp bore axis F is such that when the loop 2 is folded down parallel to the monopod 3, there is a space between the loop 2 and the monopod 3. Such space between the loop 2 and monopod 3 can be used to hook the apparatus 1 over a horizontal structure, such as a fence rail 72 (FIG. 3) to provide a stationary support for the apparatus 1.

With lower sections 12 of the monopod 3 retracted somewhat, the loop 2 can be angled perpendicular to the monopod 3, the loop 2 can be placed on a horizontal structure, such as a bleacher seat 76 (FIG. 4) and sat on by the photographer to provide stabile support for the apparatus 1. The loop 2 can be provided with a seat cushion 78 extending across the loop 2 for more comfortable sitting on the loop 2. It is foreseen that such a seat cushion 78 can be selectively removable from the loop 2, as needed. The cushion 78 may have edges 79 (FIG. 11) which overlap the loop 2 to retain the cushion 78 within the loop 2. Referring to FIG. 5, the sections 12 of the monopod 3 can be collapsed and the loop 2 positioned at an angle to provide stabile support for a camera 10 with the apparatus 1 positioned on a floor or the ground. Referring to FIG. 7, the loop 2 can be angled outward from the monopod 3, such as perpendicularly, and the lower end 22 of the monopod 3, fully extended, and the loop 2 can be grasped to use the apparatus 1 in the manner of a camera boom.

Referring to FIG. 8, the apparatus 1 is shown in use with a belt worn flagpole support cup 82 of the type used for carrying flags in parades. The stabilizer loop 2 can be oriented for grasping by one or both hands of the photographer to provide elevated support for the camera 10 mounted on the top end 18 of the monopod 3. Such usage can be for photographing subjects at an elevated position, for example, or for a perspective above a crowd of people at an event.

FIG. 9 shows the apparatus 1 in use by a photographer seated in a wheelchair 86. The stabilizer loop 2 (not shown in FIG. 9) can be oriented relative to the monopod 3 to enable the photographer to sit on the loop to thereby stabilize a camera 10 supported by the apparatus.

FIG. 10 shows the apparatus 1 in use to support a camera 10 using a ladder 90, such as a step ladder. The stabilizer loop 2 may be oriented horizontally and rested on a rung or step of the ladder 90 or on a top of the ladder. It is foreseen that a photographer may sit on the loop 2 to further stabilize the camera 10 mounted on the monopod 3.

It is to be understood that while certain forms of the present invention have been described and illustrated herein, it is not to be limited to the specific forms or arrangement of parts described and shown.

What is claimed and desired to be secured by Letters Patent is:

1. A stabilizer frame apparatus for use with a monopod camera support to resist vibration and comprising:
    (a) a clamp structure including a camera support clamp adapted to secure the clamp structure to a monopod camera support wherein the monopod has an elongate first axis;
    (b) a stabilizer frame having at least a control portion thereof with a circular cross section;
    (c) the clamp structure including a pair of bearing plates positioned on opposite sides of the frame control portion; the bearing plates being selectively adjustable relative to each other to create a constant selected friction between the clamp structure and the frame; the clamp structure including an elongate pass through cylindrically shaped bore that has a second axis that is aligned perpendicular to the first axis when utilized with a monopod; the stabilizer frame having a mating cylindrical section that is received in the clamp structure bore;
    (d) whereby the frame is angularly positionable relative to the camera support such that during use with the monopod a portion of the stabilizer frame that is spaced from the clamp structure rotates about the clamp structure bore so as to move toward and away from the monopod by manual manipulation of a user when the user applies sufficient force to overcome the constant friction, but holding the frame in a fixed position relative to the camera support when the frame is released by a user such that the joining of the frame to the support clamp provides both manually adjustable articulation of the frame relative to the camera support and maintenance of a selected holding position of the frame relative to the camera support after articulation so as to stabilize a camera mounted on the camera support and limit vibration of the camera.

2. An apparatus as set forth in claim 1 wherein:
    (a) the frame and camera support are placed in a clamping position therebetween by release of a user which clamping position is held in place by the friction between the section of the frame and the bore of the support clamp.

3. An apparatus as set forth in claim 1 wherein:
    (a) the frame is a loop that is covered with a vibration reducing foam throughout the length thereof except in a cylindrical portion of the loop adjacent to the support clamp bearing plates and the bearing plates act on opposite sides of the cylindrical portion of the loop.

4. An apparatus as set forth in claim 1 wherein:
    (a) the frame clamp frictionally engages the frame in such a manner as to enable selective and continuous angular articulation of the frame member relative to an elongated camera support through a range of angles between the frame member and such an elongated camera support by application of manual force to the frame; and
    (b) friction between the frame clamp and frame is of such a character as to retain the frame at a set angle relative to the clamp structure and to enable the friction to be overcome to enable manual repositioning of the frame relative to the clamp structure.

5. An apparatus as set forth in claim 1 wherein:
    (a) the support clamp has a support clamp axis;
    (b) the frame clamp has a frame clamp axis; and
    (c) the frame clamp axis is substantially perpendicular to the support clamp axis.

6. An apparatus as set forth in claim 1 wherein:
    (a) the support clamp has a support clamp axis;
    (b) the frame clamp has a frame clamp axis;
    (c) the frame clamp axis is substantially perpendicular to the support clamp axis; and
    (d) the frame clamp axis is positioned in spaced relation to the support clamp axis.

7. An apparatus as set forth in claim 1 where in:
    (a) the frame has a loop shape.

8. An apparatus as set forth in claim 1 wherein:
    (a) the frame has a rectangular loop shape.

9. An apparatus as set forth in claim 1 wherein:
    (a) the frame is padded.

10. An apparatus as set forth in claim 1 wherein:
    (a) the frame has a seat pad extending thereacross.

11. An apparatus as set forth in claim 1 in combination with an elongated camera support.

12. The apparatus according to claim 1 wherein the frame is at least partially covered with a vibration dampening coating.

13. A camera support apparatus adapted to support and resist vibration comprising:
  (a) an elongated monopod adapted to support a camera secured to the monopod; the monopod has a first elongate axis;
  (b) a stabilizer frame having a first portion with a circular cross section and an elongate cylindrical shaped portion;
  (c) a clamp structure including a monopod mounting clamp adapted to secure the clamp structure to the monopod;
  (d) the clamp structure including a frame clamp securing the frame to the clamp structure; the clamp structure having an elongate cylindrical shaped bore with a second axis; the clamp structure bore matingly receiving the stabilizer frame cylindrical shaped portion and allowing rotation therebetween; the monopod axis being aligned perpendicular to the clamp structure bore second axis; the clamp structure including at least one bearing plate applying a selected pressure against the frame first portion to provide a selected set friction therebetween; and
  (e) the frame clamp engaging the frame member under the selected friction in such a manner as to enable selective angular articulation of the frame relative to the monopod with a portion of the frame that is spaced away from the clamp structure rotating about the second axis toward and away from the monopod when pressure is applied by a user to the frame by manual manipulation to position the frame in a selected position relative to the monopod and thereafter retain the frame in the selected position so as to stabilize the camera against vibration and motion.

14. An apparatus as set forth in claim 13 wherein:
  (a) the frame clamp frictionally engages the frame in such a manner as to enable selective and continuous angular articulation of the frame relative to the monopod through an infinite range of angles of the frame relative to the monopod due to manipulation by a user to overcome the selected friction; and
  (b) friction between the frame clamp and frame member is also of such a character as to retain the frame member at a set angle relative to the monopod so as to clamp the monopod relative to a fixed structure held between the frame and the monopod when the user ceases applying manual manipulation.

15. An apparatus as set forth in claim 13 wherein:
  (a) the support clamp has a support clamp axis;
  (b) the frame clamp has a frame clamp axis;
  (c) the frame clamp axis is substantially perpendicular to the support clamp axis; and
  (d) the frame clamp axis is positioned in spaced relation to the support clamp axis.

16. An apparatus as set forth in claim 13 wherein:
  (a) the frame has a loop shape of uniform cross section and is covered with a vibration reducing foam except for the first portion thereof and the first part is cylindrical in shape.

17. An apparatus as set forth in claim 13 wherein:
  (a) the frame is padded.

18. An apparatus as set forth in claim 13 wherein:
  (a) the frame has seat pad extending thereacross.

19. An apparatus as set forth in claim 13 wherein:
  (a) the monopod is formed of telescoping sections which are releasably securable in such a manner as to enable selective lengthening and shortening of the monopod.

20. The apparatus according to claim 13 wherein the frame is at least partially covered with a vibration dampening coating.

21. A camera support and vibration dampening apparatus comprising:
  (a) an elongated monopod adapted to support and stabilize a camera against vibration and motion; the monopod having an elongate first axis;
  (b) a loop shaped stabilizer frame member of circular cross section with a portion thereof being elongate and cylindrical in shape;
  (c) a clamp structure including a monopod mounting clamp releasably securing the clamp structure to the monopod;
  (d) the clamp structure including a frame clamp securing the frame member to the clamp structure;
  (e) the frame clamp having opposed bearing plates having a generally cylindrical and elongate bore whereat the plates come together that matingly receives the cylindrical shaped portion of the loop; the bore having a second axis that is perpendicularly aligned relative to the monopod first axis and that allows rotation under friction of the loop portion therein; the frame claim bore frictionally engaging the cylindrically shaped portion of the loop under a selected friction in such a manner that the friction enables a user to overcome the selected friction by manual manipulation of the frame member through a range of angles of the frame member relative to the monopod by the user; and
  (f) the selected friction between the frame clamp and frame member is also of such a character as to retain the frame member at a set angle relative to the monopod when not under manipulation by a user so as to lock the frame member in a fixed angular relationship to the monopod and to a fixed object when not being manipulated by a user so as to stabilize a camera secured to the monopod relative to vibration and motion.

22. An apparatus as set forth in claim 21 wherein:
  (a) the support clamp has a support clamp axis;
  (b) the frame clamp has a frame clamp axis;
  (c) the frame clamp axis is substantially perpendicular to the support clamp axis; and
  (d) the frame clamp axis is positioned in spaced relation to the support clamp axis.

23. An apparatus as set forth in claim 21 wherein:
  (a) the frame member has a rectangular loop shape.

24. An apparatus as set forth in claim 21 wherein:
  (a) the frame member is foam padded so as to reduce vibration transmission between a fixed structure upon which the frame member is placed and the monopod.

25. An apparatus as set forth in claim 21 wherein:
  (a) the frame member has seat pad extending thereacross.

26. An apparatus as set forth in claim 21 wherein:
  (a) the monopod is formed of telescoping sections which are releasably securable in such a manner as to enable selective lengthening and shortening of the monopod.

* * * * *